United States Patent
Hackfort et al.

(10) Patent No.: US 12,427,759 B2
(45) Date of Patent: *Sep. 30, 2025

(54) BIODEGRADABLE MULTI-LAYER FILM

(71) Applicant: BIO-TEC BIOLOGISCHE NATURVERPACKUNGEN GMBH & CO. KG, Emmerich (DE)

(72) Inventors: Ralf Hackfort, Emmerich (DE); Johannes Mathar, GP's-Heerenberg (NL); Frank Rörthmans, Issum-Sevelen (DE); Harald Schmidt, Emmerich (DE); Christoph Hess, Rees (DE)

(73) Assignee: BIO-TEC BIOLOGISCHE NATURVERPACKUNGEN GMBH & CO. KG, Emmerich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/838,988

(22) Filed: Jun. 13, 2022

(65) Prior Publication Data

US 2022/0297414 A1    Sep. 22, 2022

Related U.S. Application Data

(63) Continuation of application No. 15/527,846, filed as application No. PCT/EP2015/077112 on Nov. 19, 2015, now Pat. No. 11,358,378.

(30) Foreign Application Priority Data

Nov. 19, 2014   (DE) ........................ 102014017015.2

(51) Int. Cl.
*B32B 27/30* (2006.01)
*B29C 48/08* (2019.01)
(Continued)

(52) U.S. Cl.
CPC ............. *B32B 27/306* (2013.01); *B32B 3/28* (2013.01); *B32B 7/022* (2019.01); *B32B 9/02* (2013.01); *B32B 9/045* (2013.01); *B32B 27/08* (2013.01); *B32B 27/18* (2013.01); *B32B 27/36* (2013.01); *B29C 48/08* (2019.02); *B29C 48/16* (2019.02); *B29C 48/18* (2019.02); *B29C 65/00* (2013.01); *B29K 2003/00* (2013.01); *B29K 2029/04* (2013.01); *B29K 2029/14* (2013.01); *B29K 2067/00* (2013.01); *B29K 2067/04* (2013.01); *B29K 2067/046* (2013.01); *B32B 9/04* (2013.01); *B32B 27/30* (2013.01); *B32B 37/15* (2013.01); *B32B 37/153* (2013.01); *B32B 37/16* (2013.01); *B32B 2250/03* (2013.01); *B32B 2250/24* (2013.01); *B32B 2250/244* (2013.01); *B32B 2250/40* (2013.01); *B32B 2307/50* (2013.01); *B32B 2307/54* (2013.01); *B32B 2307/558* (2013.01); *B32B 2307/582* (2013.01); *B32B 2307/5825* (2013.01); *B32B 2307/716* (2013.01); *B32B 2307/7163* (2013.01); *B32B 2307/7166* (2013.01); *B32B 2307/726* (2013.01); *B32B 2307/7265* (2013.01); *B32B 2317/20* (2013.01); *B32B 2329/04* (2013.01); *B32B 2331/04* (2013.01); *B32B 2367/00* (2013.01); *B32B 2439/00* (2013.01); *B32B 2439/06* (2013.01); *B32B 2439/46* (2013.01); *B32B 2553/00* (2013.01); *C08J 5/18* (2013.01); *C08J 2300/16* (2013.01); *C08L 29/04* (2013.01); *C08L 31/04* (2013.01); *C08L 67/02* (2013.01); *C08L 67/03* (2013.01); *C08L 67/04* (2013.01); *C08L 2201/06* (2013.01);

(Continued)

(58) Field of Classification Search
None
See application file for complete search history.

(56) References Cited

U.S. PATENT DOCUMENTS

| | | |
|---|---|---|
| 4,372,311 A | 2/1983 | Potts |
| 4,469,728 A | 9/1984 | Belz |

(Continued)

FOREIGN PATENT DOCUMENTS

| | | |
|---|---|---|
| DE | 202010005911 U1 | 6/2011 |
| EP | 0010171 A1 | 4/1980 |

(Continued)

OTHER PUBLICATIONS

De Koning, G. J. M. et al. "Ageing phenomena in bacterial poly[(R)-3-hydroxybutyrate]. 1. A study on the mobility in poly[(R)-3-hydroxybutyrate] powders by monitoring the radical decay with temperature after γ-radiolysis at 77 K." Polymer, vol. 33, Issue 15, 1992, pp. 3295-3297. (Year: 1992).*

(Continued)

*Primary Examiner* — Vivian Chen
(74) *Attorney, Agent, or Firm* — Workman Nydegger

(57) ABSTRACT

A multi-layer polymer film comprising at least one middle layer A, the polymeric constituents of which are soluble in aqueous solution, and at least one substantially water-impermeable covering layer B or C arranged above and/or below the at least one middle layer A, wherein the layers A, B and C independently of each other in each case comprise at least one thermoplastic polymer and at least one of the covering layers B and C comprises at least one polyhydroxyalkanoate. Processes for the production of the multi-layer polymer film according to the invention and its use for the production of molded parts, films or bags are furthermore presented and described.

22 Claims, No Drawings

(51) Int. Cl.

| | |
|---|---|
| B29C 48/16 | (2019.01) |
| B29C 48/18 | (2019.01) |
| B29C 65/00 | (2006.01) |
| B29K 29/00 | (2006.01) |
| B29K 67/00 | (2006.01) |
| B32B 3/28 | (2006.01) |
| B32B 7/022 | (2019.01) |
| B32B 9/02 | (2006.01) |
| B32B 9/04 | (2006.01) |
| B32B 27/08 | (2006.01) |
| B32B 27/18 | (2006.01) |
| B32B 27/36 | (2006.01) |
| B32B 37/15 | (2006.01) |
| B32B 37/16 | (2006.01) |
| C08J 5/18 | (2006.01) |
| C08L 29/04 | (2006.01) |
| C08L 31/04 | (2006.01) |
| C08L 67/02 | (2006.01) |
| C08L 67/03 | (2006.01) |
| C08L 67/04 | (2006.01) |

(52) U.S. Cl.
CPC ....... *C08L 2203/16* (2013.01); *C08L 2205/02* (2013.01); *C08L 2205/03* (2013.01); *Y10T 428/31786* (2015.04)

(56) References Cited

U.S. PATENT DOCUMENTS

| | | | |
|---|---|---|---|
| 4,762,738 A | 8/1988 | Keyes et al. | |
| 5,009,648 A | 4/1991 | Aronoff et al. | |
| 5,108,807 A | 4/1992 | Tucker | |
| 5,258,422 A | 11/1993 | Chang et al. | |
| 5,292,783 A | 3/1994 | Buchanan et al. | |
| 5,391,423 A | 2/1995 | Wnuk et al. | |
| 5,446,079 A | 8/1995 | Buchanan et al. | |
| 5,470,526 A | 11/1995 | Wilfong et al. | |
| 5,489,470 A | 2/1996 | Noda | |
| 5,789,536 A * | 8/1998 | Liggat | C08G 63/06 264/901 |
| 5,849,401 A | 12/1998 | El-Afandi et al. | |
| 5,874,040 A * | 2/1999 | Liggat | C08G 63/88 528/502 R |
| 5,939,467 A | 8/1999 | Wnuk et al. | |
| 6,075,118 A | 6/2000 | Wang et al. | |
| 6,127,512 A | 10/2000 | Asrar et al. | |
| 6,514,602 B1 | 2/2003 | Zhao et al. | |
| 6,552,162 B1 | 4/2003 | Wang et al. | |
| 6,592,892 B1 | 7/2003 | Williams | |
| 11,358,378 B2 * | 6/2022 | Hackfort | B32B 7/022 |
| 2002/0143136 A1 * | 10/2002 | Noda | C08L 67/04 528/272 |
| 2002/0177827 A1 * | 11/2002 | Noda | B32B 38/0004 604/385.01 |
| 2002/0188041 A1 | 12/2002 | Bond et al. | |
| 2003/0108701 A1 * | 6/2003 | Bond | B32B 27/36 428/35.7 |
| 2003/0236358 A1 * | 12/2003 | Autran | C08L 67/04 525/418 |
| 2004/0126585 A1 | 7/2004 | Kerins et al. | |
| 2005/0069711 A1 | 3/2005 | Patel | |
| 2005/0209374 A1 | 9/2005 | Matosky et al. | |
| 2005/0244606 A1 | 11/2005 | Egawa | |
| 2006/0045940 A1 | 3/2006 | Tweed et al. | |
| 2006/0106162 A1 * | 5/2006 | Yamaguchi | C08L 67/04 525/63 |
| 2006/0121220 A1 | 6/2006 | Miksic et al. | |
| 2006/0240726 A1 * | 10/2006 | Hodson | B32B 27/12 442/59 |
| 2008/0108748 A1 | 5/2008 | Buckley et al. | |
| 2008/0147034 A1 * | 6/2008 | Wang | C08L 3/04 428/339 |
| 2008/0161449 A1 | 7/2008 | Yamamoto et al. | |
| 2008/0281018 A1 | 11/2008 | Seeliger et al. | |
| 2009/0018235 A1 * | 1/2009 | Nascimento | C08L 67/04 524/400 |
| 2009/0054548 A1 * | 2/2009 | Wang | C08L 3/08 604/364 |
| 2009/0123728 A1 | 5/2009 | Cheung et al. | |
| 2009/0258982 A1 | 10/2009 | Kawahara et al. | |
| 2009/0286031 A1 | 11/2009 | Shi et al. | |
| 2009/0286906 A1 | 11/2009 | Shi et al. | |
| 2010/0105822 A1 | 4/2010 | Girioli et al. | |
| 2010/0330382 A1 | 12/2010 | Dou et al. | |
| 2011/0081692 A1 | 4/2011 | Tsuge et al. | |
| 2011/0178196 A1 | 7/2011 | Steinke et al. | |
| 2011/0189414 A1 * | 8/2011 | Whitehouse | C08K 5/0083 521/138 |
| 2012/0035323 A1 | 2/2012 | Donnelly | |
| 2012/0107630 A1 | 5/2012 | Krishnaswamy et al. | |
| 2012/0130331 A1 | 5/2012 | Wang et al. | |
| 2012/0135169 A1 | 5/2012 | Tangelder et al. | |
| 2012/0328842 A1 | 12/2012 | Afshari | |
| 2013/0011593 A1 | 1/2013 | Wang et al. | |
| 2013/0065046 A1 | 3/2013 | Krishnaswamy | |
| 2013/0255713 A1 | 10/2013 | Schnitzler et al. | |
| 2013/0309166 A1 | 11/2013 | Rizk et al. | |
| 2014/0005620 A1 * | 1/2014 | Wang | B29C 48/49 428/220 |
| 2014/0030536 A1 | 1/2014 | Krishnaswamy | |
| 2014/0073745 A1 | 3/2014 | Bailey et al. | |
| 2014/0296389 A1 | 10/2014 | Caballero et al. | |
| 2015/0166785 A1 | 6/2015 | Minami et al. | |
| 2015/0337094 A1 | 11/2015 | Wong et al. | |
| 2016/0060451 A1 | 3/2016 | Schmidt et al. | |
| 2017/0224540 A1 | 8/2017 | Li et al. | |
| 2017/0247154 A1 | 8/2017 | Ieda et al. | |
| 2017/0259976 A1 * | 9/2017 | Lee | A45F 5/00 |
| 2020/0056037 A1 | 2/2020 | Schmidt et al. | |

FOREIGN PATENT DOCUMENTS

| | | |
|---|---|---|
| EP | 0800455 B1 | 2/2002 |
| EP | 1939248 A1 | 7/2008 |
| JP | 2001-183613 A | 7/2001 |
| JP | 2005-507018 A | 3/2005 |
| JP | 2011-183613 A | 9/2011 |
| JP | 2014-144553 A | 8/2014 |
| WO | WO 94/17121 A * | 8/1994 |
| WO | 96/20831 A1 | 7/1996 |
| WO | 03/35753 A1 | 5/2003 |
| WO | 2009/049667 A1 | 4/2009 |
| WO | 2012/066436 A2 | 5/2012 |

OTHER PUBLICATIONS

De Koning, G. J. M. et al. "Crystallization phenomena in bacterial poly[(R)-3-hydroxybutyrate]: 2. Embrittlement and rejuvenation." Polymer, vol. 34, Issue 19, 1993, pp. 4089-4094. (Year: 1993).*

De Koning, G. J. M. et al. "Crystallization phenomena in bacterial poly[(R)-3-hydroxybutyrate]: 3. Toughening via texture changes." Polymer, vol. 35, Issue 21, Oct. 1994, pp. 4598-4605. (Year: 1994).*

Smits, A. L. M. "The Molecular Organisation in Starch Based Products: The Influence of Polyols used as a Plasticisers." Utrecht University Repository (2001). (Year: 2001).*

"PubChem—3-Hydroxybutyrate" - (https://pubchem.ncbi.nlm.nih.gov/compound/3-Hydroxybutyrate) (webpage retrieved 2024) (Year: 2024).*

IPRP cited in PCT/EP2015/077112 dated May 23, 2017.

JP 2011-183613 A (published Sep. 22, 2011) (Konishi et al) English machine translation via Google (webpage retrieved Jan. 30, 2020). (Year: 2011).

JP 2014-144553 A (published Aug. 14, 2014) (Suzuki etal) English machine translation via Google (webpage retrieved Jan. 30, 2020). (Year: 2014).

Taizo Kabe et al. "Preparation, Structure Analysis and Enzymatic Degradation of Poly Gel-films", Jun. 10, 2010.

(56) References Cited

OTHER PUBLICATIONS

WO 2009-049667 A (published Apr. 23, 2009) (Schimdt etal) English machine translation via Google (webpage retrieved Jan. 30, 2020). (Year: 2009).

\* cited by examiner

BIODEGRADABLE MULTI-LAYER FILM

CROSS REFERENCE TO RELATED APPLICATIONS

This Application is a continuation of U.S. application Ser. No. 15/527,846, filed May 18, 2017, which is a 371 of International Application No. PCT/EP2015/077112, filed Nov. 19, 2015, which claims the benefit of German Application No. 10 2014 017 015.2, filed Nov. 19, 2014. The foregoing applications are incorporated by reference in their entireties.

BACKGROUND

The invention relates to a multi-layer polymer film and a process for the production thereof. The invention furthermore relates to the use of the multi-layer polymer film for the production of molded parts, packaging films or bags, in particular plastic carrier bags. The invention finally also relates to molded parts, films and bags produced from the multi-layer polymer films according to the invention.

From the point of view of preserving fossil resources, waste disposal and reducing $CO_2$ emissions, it is desirable to replace the widely used conventional plastics based on fossil raw material sources by plastics which can be obtained at least partially or completely from renewable raw materials. Polymers which are based at least partially or completely on renewable raw materials are also called "biobased" polymers.

Biodegradable plastics are not necessarily also simultaneously biobased. Thus, there are some plastics from fossil, non-renewable resources which are biodegradable. Biodegradability as a rule is not linked to the raw material basis but depends substantially on the chemical structure of the material and its capacity for converting itself into naturally occurring metabolism end products by biological activity.

In practice, polymer compositions based on starch and aromatic-aliphatic copolyesters have proved to be biodegradable polymer compositions with outstanding mechanical properties.

In addition to starch and starch derivatives, polyhydroxyalkanoates (PHA) are also promising biobased substitute materials for polymers of fossil origin. PHAs are naturally occurring linear polyesters of hydroxy acids which are formed by many bacterial as reserve substances for carbon and energy and are deposited inside the cells in the form of granules. The industrial biotechnological PHA production using natural or genetically modified bacteria strains or plants is known from the prior art. An overview of the various PHAs and their production is given by the chapter "Polyhydroxyalkanoates" in "Handbook of Biodegradable Polymers", pages 219 to 256, published by Rapra Technologies Limited, 2005.

The main uses of biodegradable polymer compositions lie in the packaging and catering sector. In addition, uses exist in agriculture and horticulture, as well as in the pharmaceutical and medical sector. Biodegradable polymer compositions are particularly relevant for the production of refuse sacks, carrier bags, disposable utensils (beakers, cups, plates, cutlery), packaging films, bottles, fruit and vegetable dishes (so-called trays), packaging aids (loose-fill chips), mulch films, flowerpots and the like.

Carrier bags and packaging films precisely represent a significant source of contamination of bodies of water and oceans. Since many of the carrier bags currently employed are not biodegradable, contamination of bodies of water and oceans with plastics is increasing more and more. Carrier bags made of non-biodegradable plastics represent a danger to aquatic and marine animals, since the animals can trap themselves in these carrier bags and as a results become severely restricted in their mobility or even suffocate. Carrier bags broken up into smaller constituents likewise represent a problem, since these constituents can be eaten by the animals but cannot be broken down by the animals.

However, the carrier bags made of biodegradable plastics employed to date also do not yet solve the problem of contamination of bodies of water and oceans with plastics. The biodegradable plastics for the carrier bags are normally tested for their degradability under specific conditions which prevail in industrial composting installations. Inter alia, temperatures of approximately 58° C. prevail there, and specific microorganisms are employed in a targeted manner for the biodegradation. These conditions promote the biodegradation of the plastics to a very high degree. In bodies of water or in the ocean, however, such conditions which favor biodegradation are not to be encountered. A further difference is the availability of oxygen. While in industrial composting installations the oxygen content can be controlled and adjusted for optimum conditions, especially in the ocean an oxygen deficiency may exist in certain layers, which severely slows down biodegradation. Carrier bags made of biodegradable plastics therefore also do not necessarily degrade so quickly in bodies of water or oceans that they represent no danger to aquatic and marine animals.

The object which emerges from that described above comprises two apparently opposite aspects. On the one hand, a film is to be available which is favorable to produce, can be processed easily, and for carrier bags and/or packaging films has a stability which is adequate for use under various weather conditions. On the other hand, the carrier bag and/or the packaging film is not to represent a danger to aquatic and marine animals and therefore is to decompose and/or biodegrade rapidly in aqueous solution.

It is envisaged in this context that such films are fed to the regulated disposal provided for them, for example composting installations. In the case of misdirected products made of such films, they are not to contribute in the long term to a contamination of bodies of water and/or oceans.

Various films which are partially biodegradable are known in the prior art.

WO 2012/066436 A2 thus describes a multi-layer film which comprises a water soluble layer and a water-impermeable layer. The water-impermeable layers are said to be biodegradable (in industrial installations) under aerobic conditions, the water soluble layer can comprise biodegradable plastics. No information is given on the biodegradability under more difficult conditions, such as, for example, under anaerobic conditions or in aqueous solutions.

US 2007/0149708 A1 describes a polymeric material which is obtained by simultaneous polymerization of water-absorbing polymer particles with a monomer, such as styrene, ethylene, chloroethylene or vinyl acetate.

U.S. Pat. No. 8,227,059 B2 describes a two-layer film for excrement bags which contains an enzyme and is made of a water-insoluble layer and a layer which decomposes in water. The water-insoluble layer is said to be degraded by the enzyme in water. No information is given on the mechanical properties of the film.

The solutions described in the prior art have the common disadvantage that either the mechanical properties during use or the decomposition and the biodegradation in aqueous solution are inadequate.

SUMMARY

Starting from the prior art described above, an object of the invention is to provide a film which is favorable to produce. Furthermore, the film should be easy to process. The film should moreover have, for carrier bags and/or films, a mechanical stability which is adequate for used under various weather conditions. In addition, a carrier bag and/or film produced from the film should not represent a danger to aquatic and marine animals. For this, the film should decompose into smaller constituents in aqueous solution preferably within a few days. The constituents can then biodegrade over a longer period of time, in particular biodegrade completely.

DETAILED DESCRIPTION

The multi-layer polymer film according to the invention comprises at least one middle layer A, the polymeric constituents of which are soluble in aqueous solution, and in each case at least one substantially water-impermeable covering layer B, C arranged above and below the at least one middle layer A, wherein the layers A, B and C independently of each other in each case comprise at least one thermoplastic polymer and at least one of the covering layers B and C comprises at least one polyhydroxyalkanoate.

It has been found, surprisingly, that the use of polyhydroxyalkanoates in at least one of the covering layers leads to the polymer film being able to decompose into smaller constituents in aqueous solution within a few days. Cracks probably initially form in at least one of the covering layers, through which presumably the aqueous solution can attack the constituents of the middle layer which are soluble in aqueous solution. As a result, the polymer film as a whole decomposes into smaller constituents. Without the intention of being bound to a scientific theory, this surprising effect seems to be explainable by the tendency of polyhydroxyalkanoates to undergo post-crystallization. Materials which comprise polyhydroxyalkanoates as a result conventionally become fragile and brittle after several days, which is why minor external influences can lead to cracks in these materials.

After the decomposition the individual constituents can be biodegraded, in particular completely biodegraded.

Where aqueous solution is referred to here or elsewhere, this means pure water or a mixture which contains water. Water can be contained in the aqueous solution in particular in an amount of at least 50 vol. %, in particular at least 90 vol. % or more. The aqueous solution can furthermore contain dissolved constituents, such as e.g. salts. Examples of aqueous solutions are, in addition to distilled water, above all fresh water and sea water.

The solubility of polymeric constituents in aqueous solution can be determined, for example, by determining the loss in weight of a sample of the polymeric constituents by simple weighing after the sample has been exposed to a defined amount of an aqueous solution at a defined temperature for a defined time. Soluble in the context of the invention can mean, in particular, that a loss in weight of 100% is found when 1 g of the sample is exposed to 50 ml of an aqueous solution at 100° C. for 5 minutes.

Where decomposition is referred to here or elsewhere, this can mean, in particular, the disintegration of the starting structure into parts, in particular into smaller constituents. Decomposition in the context of the invention can include, in particular, also dissolving and the chemical or biological decomposition into smaller molecules or the conversion into chemical or biological degradation products.

The water impermeability can be determined, for example, in accordance with DIN EN 20811:1992. Water-impermeable in the context of the invention can mean in particular that the layer withstands a column of water of at least 20 mm, in particular at least 50 mm, at least 100 mm, at least 200 mm, at least 500 mm, at least 1,000 mm or at least 1,500 mm. Measurement can take place, for example, at a layer thickness of 20 μm.

In a preferred embodiment of the invention the polyhydroxyalkanoate is contained in the polymer film according to the invention in at least one of the covering layers B and/or C in an amount of at least 10 wt. %, in particular at least 15 wt. % or at least 20 wt. %, based on the total weight of the particular covering layer. If the polyhydroxyalkanoate is used in these amounts, the resulting polymer film has good mechanical properties and decomposes in aqueous solution in a few days.

Where polyhydroxyalkanoate is referred to here, this means esters of polyhydroxy fatty acids which comprise monomers having a chain length of at least 4 carbon atoms, in particular from 4 to 18 carbon atoms or from 4 to 9 carbon atoms. Polylactic acid therefore, e.g., is not a polyhydroxyalkanoate in the context of the invention, whereas poly-3-hydroxybutyrate (PHB) or poly-4-hydroxybutyrate (P4HB) is.

According to the invention the polyhydroxyalkanoate employed is preferably a polyhydroxyalkanoate which comprises recurring monomer units of the formula $$[-O-CHR-CH_2-C(O)-] \qquad (1)$$

wherein R denotes an alkyl group of the formula $C_nH_{2n+1}$ and n is a number from 1 to 15, preferably from 1 to 6.

For many intended uses, it is particularly suitable for the in each case at least one thermoplastic polymer of the covering layers B and/or C of the polymer film according to the invention to be decomposable by hydrolysis. It can be ensured in this manner that the polymeric constituents of the polymer film can also decompose in water.

It has proved particularly practicable for the in each case at least one thermoplastic polymer of the covering layers B and/or C in the polymer film according to the invention to be selected independently of each other from the group consisting of thermoplastic starch, starch-containing thermoplastics, polyvinyl alcohol, thermoplastic polyvinyl alcohol, polyvinyl acetate, poly(3-hydroxybutanoate), poly(3-hydroxyvalerate), poly(3-hydroxyhexanoate), poly(3-hydroxybutyrate-co-3-hydroxyvalerate), poly(3-hydroxybutyrate-co-3-hydroxy-hexanoate), polylactic acid, polycaprolactone, polybutylene succinate, polybutylene adipate-co-succinate), aromatic-aliphatic copolyester, poly(butylene adipate-co-terephthalate), poly(butylene sebacate-co-terephthalate) and mixtures thereof.

According to an advantageous embodiment of the invention at least one of the covering layers B and/or C of the polymer film according to the invention can comprise 5 to 70 wt. %, preferably 10 to 70 wt. %, preferably 20 to 70 wt. %, preferably 20 to 65 wt. %, further preferably 20 to 60 wt. %, particularly preferably 30 to 58 wt. %, still more preferably 30 to 55 wt. %, most preferably 30 to 50 wt. % of aliphatic-aromatic copolyester, in each case based on the total weight of the covering layer. Where "aliphatic-aromatic copolyester" is referred to here, this also includes mixtures of various aliphatic-aromatic copolyesters.

Advantageously, at least one of the covering layers B and/or C of the polymer film according to the invention comprises aliphatic-aromatic copolyesters which in accordance with EN 13432 are biodegradable and/or have a glass transition temperature (Tg) of less than 0° C., in particular less than −4° C., further preferably less than −10° C., still further preferably less than −20° C. and most preferably less than −30° C. Preferably, the aliphatic-aromatic copolyesters comprised in at least one of the covering layers of the polymer film according to the invention are, where present, furthermore thermoplastic.

According to a particularly preferred embodiment of the invention a statistical copolyester based on at least adipic acid and/or sebacic acid and/or succinic acid is employed as the aliphatic-aromatic copolyester. Further preferably, this is a copolyester and/or statistical copolyester based on 1,4-butanediol, adipic acid, and/or sebacic acid and/or succinic acid and terephthalic acid and/or terephthalic acid derivative (e.g. dimethyl terephthalate DMT). This can have in particular a glass transition temperature [Tg] of from −25 to −40° C., in particular −30 to −35° C., and/or a melting range of from 100 to 120° C., in particular 105 to 115° C.

Optimum results are obtained if in the polymer film according to the invention the polyhydroxyalkanoate in at least one of the covering layers B and/or C is selected from the group consisting of poly(3-hydroxybutanoate), poly(3-hydroxyvalerate), poly(3-hydroxyhexanoate), poly(3-hydroxybutyrate-co-3-hydroxyvalerate), poly(3-hydroxybutyrate-co-3-hydroxyhexanoate) and mixtures thereof. Such polymer films show good mechanical properties and decompose readily in aqueous solution.

It is particularly preferable for the polyhydroxyalkanoate in at least one of the covering layers B and/or C in the polymer film to be selected from the group consisting of poly(3-hydroxybutyrate) (PHB)

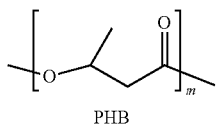

PHB and poly(3-hydroxybutyrate-co-3-hydroxyhexanoate] (PHBH)

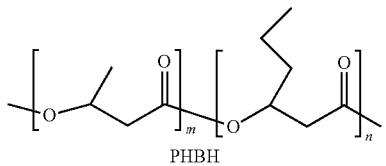

PHBH and mixtures thereof.

Particularly good results are established if the ratio m:n in the above structural formula is from 95:5 to 85:15, in particular from 90:10 to 88:12. According to a particularly preferred embodiment the polyhydroxyalkanoate comprises PHBH or consists thereof. Practical experiments have shown that a PHBH having a molar content of 3-hydroxyhexanoate of from 5 to 15 mol %, preferably 7 to 13 mol % or 10 to 13 mol %, in each case based on the total amount of PHBH, delivers very good results.

Polyhydroxyalkanoates in the context of this invention have in particular number average molecular weights MW of from 70,000 to 1,000,000 g/mol, preferably from 100,000 to 1,000,000 g/mol, preferably more preferably from 300,000 to 600,000 g/mol and/or melting points in the range of from 100 to 190° C.

The preparation of polyhydroxyalkanoates is generally known. According to a preferred embodiment of the invention the polyhydroxyalkanoate in at least one of the covering layers B and/or C of the polymer film according to the invention is produced by microorganisms in a fermentation process and/or by chemical synthesis.

Preferably, the covering layers B and C of the polymer film according to the invention in each case comprise at least one polyhydroxyalkanoate.

According to a preferred embodiment of the invention the at least one thermoplastic polymer of the covering layers B and/or C in the polymer film according to the invention is the polyhydroxyalkanoate. Such covering layers deliver good results.

According to one embodiment of the invention the covering layers B and/or C comprise starch, starch derivative, destructured starch and/or thermoplastic starch, preferably in an amount of in each case or in total less than 10 wt. %, further preferably less than 8 wt. %, further preferably less than 5 wt. %, further preferably less than 3 wt. %, still further preferably less than 1 wt. %, based on the total weight of the particular covering layer. Advantageously, the covering layers B and/or C comprise no starch, starch derivative, destructured starch and/or thermoplastic starch.

For many intended uses it is advantageous if the covering layers B and C in the polymer film according to the invention to comprise, in accordance with ASTM D6866, in each case at least 40%, in particular at least 45% or 50% of biobased carbon, based on the total amount of carbon of the particular covering layers. This additionally leads to a lasting polymer film.

Practical experiments have shown that it is advantageous for the covering layers B and/or C of the polymer film according to the invention, in accordance with ISO 15985 and/or in accordance with ISO 14855, to be biodegradable to the extent of in each case at least 40%, in particular at least 45% or at least 50%, further preferably at least 60%, further preferably at least 70%, still further preferably at least 80%, further preferably at least 90%, most preferably at least 95%. Such films show an advantageous biodegradability.

Preferably, the middle layer A of the polymer film according to the invention, in accordance with ISO 15985 and/or in accordance with ISO 14855, is biodegradable to the extent of at least 40%, in particular at least 50%, preferably at least 60%, further preferably at least 70%, further preferably at least 80%, still further preferably at least 90%, most preferably at least 95%. These films deliver particularly good results with respect to their biodegradability.

According to a preferred embodiment of the polymer film according to the invention the covering layers B and/or C, in accordance with EN 13432, are biodegradable, in particular completely biodegradable. Advantageously, the middle layer A of the polymer film according to the invention, in accordance with EN 13432, is biodegradable, in particular completely biodegradable. Optimum results are obtained if the polymer film according to the invention, in accordance with EN 13432, is biodegradable, in particular completely biodegradable. This opens up the possibility of employing the polymer film, for example, also for refuse sacks which are degraded in an industrial composting installation.

The most diverse substances can be employed in principle as the at least one thermoplastic polymer of the middle layer A. It is expedient in particular for the at least one thermoplastic polymer of the middle layer A in the polymer film according to the invention to be selected from the group consisting of thermoplastic starch, starch-containing thermoplastics, polyvinyl alcohol, thermoplastic polyvinyl alcohol, polyvinyl acetate, polyethylene glycol, cellulose acetate, ethylcellulose, hydroxypropylcellulose, hydroxypropylmethylcellulose, poly(vinyl-pyrrolidone), poly(3-hydroxybutanoate), poly(3-hydroxyvalerate), poly(3-hydroxyhexanoate), poly(3-hydroxybutyrate-co-3-hydroxyvalerate), poly(3-hydroxybutyrate-co-3-hydroxy-hexanoate), polylactic acid, polycaprolactone, polybutylene succinate, polyfbutylene adipate-co-succinate), aromatic-aliphatic copolyester, poly(butylene adipate-co-terephthalate), poly(butylene sebacate-co-terephthalate) and mixtures thereof.

Further preferably, the at least one thermoplastic polymer of the middle layer A is selected from the group consisting of thermoplastic starch, starch-containing thermoplastics, polyvinyl alcohol, thermoplastic polyvinyl alcohol, polyethylene glycol, cellulose acetate, ethylcellulose, hydroxypropylcellulose, hydroxypropylmethylcellulose, poly(vinylpyrrolidone) and mixtures thereof.

If the at least one thermoplastic polymer of the middle layer A is cellulose acetate, the cellulose acetate advantageously has a degree of substitution of from 0.6 to 0.8, preferably 0.7. If the at least one thermoplastic polymer of the middle layer A is ethylcellulose, the ethylcellulose advantageously has a degree of substitution of from 1.0 to 1.5. If the at least one thermoplastic polymer of the middle layer A is hydroxypropylcellulose, the hydroxypropylcellulose advantageously has a degree of substitution of from 1.0 to 4.0, in particular from 1.5 to 3.0. If the at least one thermoplastic polymer of the middle layer A is hydroxypropylmethylcellulose, the hydroxypropylmethylcellulose advantageously has a degree of substitution of from 1.0 to 3.0, in particular from 1.5 to 2.0. In this context in the case of hydroxypropylmethylcellulose either the content of methyl groups or the content of hydroxypropyl groups can predominate. The degree of substitution of a chemical compound under consideration is understood by the person skilled in the art as meaning in particular how many atoms or atom groups of a type X have been replaced by other identical atoms or atom groupings R in a molecule. In connection with cellulose derivatives such as cellulose acetate, ethylcellulose, hydroxypropylcellulose and hydroxypropylmethylcellulose, the degree of substitution is understood by the person skilled in the art as meaning in particular how many of the OH groups have been replaced by acetate, ethoxy, 2-hydroxypropoxy or methoxy groups.

According to a further embodiment, the at least one thermoplastic polymer of the middle layer A is selected from the group consisting of polyvinyl alcohol, thermoplastic polyvinyl alcohol, polyethylene glycol, cellulose acetate, ethylcellulose, hydroxypropylcellulose, hydroxypropylmethylcellulose, poly(vinylpyrrolidone) and mixtures thereof.

According to one embodiment the middle layer A preferably comprises no starch, starch derivative, destructured starch and/or thermoplastic starch.

The polymer film according to the invention can advantageously comprise starch in at least one of the two covering layers B and/or C and/or in the middle layer A. According to the invention the starch can comprise native or modified starch. Preferably, the starch used for production of the polymer film according to the invention is obtained from potato, maize, tapioca or rice. Modified starch which is preferably employed is starch of which free OH groups are at least partially substituted. Starch modified with ether and/or ester groups, for example, is possible. Further examples of suitable modified starch are hydrophobized or hydrophilized starch, in particular e.g. hydroxypropyl-starch or carboxymethyl-starch.

If present, the starch contained in the polymer film according to the invention or the modified starch is preferably present in a destructured form. Destructured in this context means that the granular, crystalline structure of native starch has been completely or at least to the greatest extent destroyed. This can easily be ascertained, for example, by viewing blend cross-sections in a scanning electron microscope. Alternatively, the starch phase of the polymer film can be isolated and examined under a polarization microscope for the presence of crystalline constituents. Destructured starch is preferably substantially free from crystalline constituents.

Destructured starch can expediently be present in the polymer film according to the invention in the form of (optionally prefabricated) thermoplastic starch or thermoplastically processable starch (TPS).

Thermoplastic starch is generally known and is described in detail, for example, in the publications EP 0 397 819 B1, WO 91/16375 A1, EP 0 537 657 B1 and EP 0 702 698 B1. Thermoplastic starch is in general produced from native starch, such as, for example, potato starch. In order to render native starch thermoplastically processable, plasticizing agents (plasticizers), such as sorbitol and/or glycerol, are added to it. Thermoplastic starch is distinguished by a low water content, which is preferably less than 6 wt. %, based on the total weight of the thermoplastic starch. Thermoplastic starch is furthermore distinguished by its preferably substantially amorphous structure.

Preferably, thermoplastic starch which has a water content of less than 6 wt. %, preferably less than 4 wt. %, in particular less than 3 wt. %, based on the total weight of the thermoplastic starch, is employed.

It has been found that if thermoplastically processable starch having the stated water contents (<6 wt. %) is used, improved flow properties in the extruder and a reduced formation of microbubbles in the layer can be achieved.

Thermoplastic starch is obtainable, for example, by: (a) mixing starch and/or a starch derivative with at least 15 wt. % of a plasticizer, such as, for example, glycerol and/or sorbitol, (b) supplying thermal and/or mechanical energy and (c) at least partially removing the natural water content of the starch or starch derivative to a water content of less than 6 wt. %.

Advantageously, at least one of the covering layers B and/or C of the polymer film according to the invention can comprise 10 to 50 wt. %, preferably 15 to 50 wt. %, preferably 20 to 50 wt. %, still preferably 20 to 45 wt. %, still more preferably 25 to 45 wt. %, most preferably 25 to 40 wt. %, based on the total weight of the particular covering layer, of destructured starch. Where "starch" is referred to here, this also includes mixtures of various starches.

In a preferred embodiment the middle layer A of the polymer film according to the invention can comprise 20 to 100 wt. %, preferably 30 to 100 wt. %, preferably 40 to 100 wt. %, still preferably 50 to 95 wt. %, still more preferably 60 to 90 wt. %, most preferably 65 to 80 wt. %, based on the total weight of the middle layer A, of destructured starch. Where "starch" is referred to here, this also includes mixtures of various starches.

The polymer film according to the invention can advantageously comprise polyvinyl alcohol in at least one of the two covering layers B and/or C and/or in the middle layer A. Polyvinyl alcohol in the context of the invention contains at least two recurring units of vinyl alcohol and can be a homopolymer or a copolymer with one or more other monomers. Homopolymeric polyvinyl alcohol can be obtained by complete (100%) hydrolysis of polyvinyl esters, such as polyvinyl formate, polyvinyl acetate or polyvinyl propionate. The degree of hydrolysis can also be chosen as less than 100%. For example, the degree of hydrolysis can be from 60% to 99% or from 70% to 90%. The solubility of the polyvinyl alcohol in aqueous solutions can be adjusted in this manner.

According to one embodiment of the invention the middle layer A comprises, based on the total weight thereof, 40 to 100 wt. %, in particular 80 to 100 wt. %, of polyvinyl alcohol, in particular thermoplastic polyvinyl alcohol. According to a further embodiment of the invention the middle layer A substantially consists of polyvinyl alcohol, in particular thermoplastic polyvinyl alcohol.

Advantageously, the polyvinyl alcohol is a thermoplastic polyvinyl alcohol. A particularly suitable thermoplastic polyvinyl alcohol is marketed, for example, by the company Kuraray under the trade name Mowiflex TC 232.

In a preferred embodiment the polymer film according to the invention can furthermore comprise plasticizers. Examples of plasticizers are glycerol, sorbitol, arabinose, lycose, xylose, glycose, fructose, mannose, allose, altrose, galactose, gulose, iodose, inositol, sorbose, talitol and monoethoxylate, monopropoxylate and monoacetate derivatives thereof, as well as ethylene, ethylene glycol, propylene glycol, ethylene diglycol, propylene diglycol, ethylene triglycol, propylene triglycol, polyethylene glycol, polypropylene glycol, 1,2-propanediol, 1,3-propanediol, 1,2-, 1,3, 1,4-butanediol, 1,5-pentanediol, 1,6-, 1,5-hexanediol, 1,2,6-, 1,3,5-hexanetriol, neopentyl glycol, trimethylolpropane, pentaerythritol, sorbitol and acetate, ethoxylate and propoxylate derivatives thereof. The plasticizers can preferably be contained in the polymer film according to the invention in one of the two or both covering layers B and C and/or in the middle layer A. Plasticizers can be contained, for example, as a constituent of thermoplastic starch or as a constituent of thermoplastic polyvinyl alcohol.

The middle layer A of the polymer film according to the invention can advantageously furthermore comprise as a further constituent a polymer containing anhydride groups and/or epoxide groups, wherein this is preferably a copolymer containing epoxide groups. Possible polymers and/or copolymers containing epoxide groups are, in particular, those which have a number-average molecular weight MW of from 1,000 to 25,000 g/mol, in particular 3,000 to 10,000 g/mol.

Preferably, the polymer containing epoxide groups is a polymer containing glycidyl (meth)acrylate. A suitable polymer containing glycidyl (meth)acrylate is, for example, a copolymer of (a) styrene and/or ethylene and/or methyl methacrylate and/or methyl acrylate and (b) glycidyl (meth) acrylate. A copolymer which is selected from the group consisting of styrene/methyl methacrylate/glycidyl methacrylate, ethylene/methyl acrylate/glycidyl methacrylate and ethylene/glycidyl methacrylate is particular well-suited as a polymer containing glycidyl (meth)acrylate. Glycidyl (meth)acrylate is preferably contained in this in an amount of from 1 to 60 wt. %, in particular 5 to 55 wt. %, further preferably 45 to 52 wt. %, based on the total composition of the polymer containing glycidyl (meth)acrylate.

Possible polymers containing epoxide groups are furthermore copolymers which contain epoxide groups and are based on styrene, ethylene, acrylic acid esters and/or methacrylic acid esters.

The middle layer A of the polymer film according to the invention can preferably comprise 0.01 to 5 wt. %, in particular 0.05 to 3 wt. %, still more preferably 0.1 to 2 wt. % of polymer containing epoxide groups, based on the total weight of the middle layer A.

Advantageously, the covering layers B and/or C and/or the middle layer A independently of each other can additionally comprise further constituents. Examples of such further constituents are dispersing aids, such as e.g. detergents, melt stabilizers, processing auxiliaries, stabilizers, antioxidants, flame retardants, anti-blocking agents and/or fillers. Preferably, the covering layers B and/or C and/or the middle layer A independently of each other can additionally comprise further polymers, such as, for example, polyethylene glycol, polyvinyl alcohol, chitin, chitosan, cellulose, cellulose derivatives, polyesters, polydimethylaminoethyl methacrylate and mixtures thereof. In this context possible polymers are in particular those which have a number-average molecular weight of from 1,000 to 80,000 g/mol, preferably from 2,000 to 50,000 g/mol, still preferably from 3,000 to 30,000 g/mol. The covering layers B and/or C and/or the middle layer A can preferably comprise 0.1 wt. % to 10 wt. %, in particular 0.05 wt. % to 5 wt. %, still more preferably 0.1 wt. % to 3 wt. % of these polymers, based on the total weight of the particular covering layer and/or the middle layer.

The polymer film according to the invention is distinguished by good mechanical properties which render their use in carrier bags possible.

The polymer film according to the invention thus advantageously has in the dry state an elongation at break in the extrusion direction (MD, machine direction) in accordance with EN ISO 527 of 100% or more, preferably of 150% or more, further preferably 180% or more, still further preferably 200% or more, still further preferably 220% or more, still further preferably 250% or more.

The polymer film according to the invention furthermore preferably has in the dry state an elongation at break transversely to the extrusion direction (TD) in accordance with EN ISO 527 of 100% or more, preferably of 150% or more, further preferably 180% or more, still further preferably 200% or more, still further preferably 220% or more, still further preferably 250% or more.

In addition to the abovementioned features, the polymer film according to the invention can advantageously also have in the dry state a specific dart drop value in accordance with ASTM D1709 of at least 5 g/µm.

In a preferred embodiment the polymer film according to the invention has a tensile strength in the extrusion direction (MD) of at least 10 MPa, preferably at least 15 MPa, further preferably at least 20 MPa, in accordance with EN ISO 527.

Advantageously, the polymer film according to the invention has a tensile strength transversely to the extrusion direction (TD) of at least 10 MPa, preferably at least 15 MPa, further preferably at least 20 MPa, in accordance with EN ISO 527.

The polymer film according to the invention is distinguished by its disintegration and its biodegradability in aqueous solution. According to a preferred embodiment of the polymer film according to the invention the covering layers B and/or C independently of each other disintegrate in aqueous solution within at most 14 days, in particular within at most 10 days or at most 7 days, into parts having a surface area of in each case at most 60% of the total surface area of the original polymer film. Particularly good results have been achieved with such a film.

According to a further embodiment of the polymer film according to the invention the covering layers B and/or C independently of each other disintegrate in aqueous solution within at most 14 days, in particular within at most 10 days or at most 7 days, into parts having a surface area of in each case at most 100 cm$^2$.

Advantageously, the covering layers B and/or C of the polymer film according to the invention disintegrate within at most 14 days, in particular, within at most 10 days or at most 7 days, into parts which are so small that animals can no longer strangle themselves with them.

According to a preferred embodiment of the polymer film according to the invention the polymer film has a total thickness of from 10 µm to 80 µm, preferably from 20 µm to 60 µm, further preferably from 20 µm to 40 µm, still further preferably 20 µm to 35 µm, still further preferably from 25 µm to 35 µm, most preferably of 30 µm.

Preferably, the middle layer A of the polymer film according to the invention makes up 30% to 90%, preferably 40% to 85%, further preferably 40% to 80% and in particular 60% to 80% of the total thickness of the polymer film.

Advantageously, the covering layers B and C of the polymer film according to the invention together make up 10% to 70%, preferably 15% to 60%, further preferably 20% to 60% and in particular 20% to 40% of the total thickness of the polymer film. In this context the covering layers B and C can advantageously have substantially the same thickness or a different thickness.

The teaching according to the invention can also be realized according to a further embodiment of the invention in that the covering layers B and/or C of the polymer film according to the invention independently of each other have places with a lower resistance to mechanical influences and/or to aqueous solutions. The disintegration of the polymer film can be accelerated in this manner.

According to a preferred embodiment of the invention the covering layers B and/or C of the polymer film according to the invention independently of each other comprise a water-soluble polymer. The rate of disintegration of the polymer film according to the invention can be influenced depending on the nature of the water-soluble polymer and the amount of water-soluble polymer. Preferred water-soluble polymers for this purpose are selected from the group consisting of starch, thermoplastic starch, modified starch, polyvinyl alcohol, thermoplastic polyvinyl alcohol. The water-soluble polymers independently of each other can be contained in the covering layers B and/or C in an amount of from 0.1 wt. % to 40 wt. %, preferably from 0.1 wt. % to 30 wt. %, further preferably from 0.1 wt. % to 25 wt. %, further preferably from 0.5 wt. % to 20 wt. %, in particular from 1 wt. % to 15 wt. %, further preferably from 1 wt. % to 10 wt. %, in each case based on the total weight of the particular covering layer.

According to a further preferred embodiment of the invention the covering layers B and/or C of the polymer film according to the invention independently of each other comprise one or more fillers and/or one or more disintegrating agents, depending on the nature and amount of filler and/or disintegrating agent the rate of disintegration of the polymer film according to the invention can be influenced. Preferred fillers for this purpose are selected from the group consisting of calcium carbonate, talc, kaolin, dolomite, mica, silica and mixtures thereof. Disintegrating agents are known to the person skilled in the art. Preferred disintegrating agents for this purpose are selected from the group consisting of sodium bicarbonate, alginic acid, calcium alginate, sodium alginate, microcrystalline cellulose, sodium carboxymethylcellulose, starch, sodium carboxymethyl-starch, polyvinylpyrrolidone and mixtures thereof. Starch can be present in the native or destructured form. The fillers independently of each other can be contained in the covering layers B and/or C in an amount of from 0.1 wt. % to 30 wt. %, preferably from 0.1 wt. % to 25 wt. %, further preferably from 0.5 wt. % to 20 wt. %, in particular from 1 wt. % to 15 wt. %, further preferably from 1 wt. % to 10 wt. %, in each case based on the total weight of the particular covering layer. The disintegrating agents independently of each other can be contained in the covering layers B and/or C in an amount of from 0.1 wt. % to 30 wt. %, preferably from 0.1 wt. % to 25 wt. %, further preferably from 0.5 wt. % to 20 wt. %, in particular from 1 wt. % to 15 wt. %, further preferably from 1 wt. % to 10 wt. %, in each case based on the total weight of the particular covering layer.

Advantageously, the surfaces of the covering layers B and/or C of the polymer film according to the invention independently of each other have a corrugated surface. The disintegration at least of one of the covering layers in aqueous solution is promoted in this manner.

According to a further embodiment the covering layers B and/or C, in particular if they comprise a filler and/or a disintegrating agent, can be stretched. Micropores can form due to the stretching. These micropores on the one hand can render the covering layers B and/or C breathable. On the other hand, the micropores can promote the disintegration in aqueous solution. According to a further embodiment the multi-layer film can also be stretched to generate the micropores.

The mechanical properties of the polymer film according to the invention depend decisively on the mechanical properties of the particular individual layers (middle layer A, covering layers B, C). For suitability for example as carrier bags in daily use, minimum prerequisites are necessary for the individual layers.

In a preferred embodiment the covering layers B and/or C of the polymer film according to the invention in the dry state in each case have a specific dart drop value of at least 5 g/µm in accordance with ASTM D1709.

The teaching according to the invention can also be realized according to a further embodiment of the invention in that the covering layers B and/or C of the polymer film according to the invention independently of each other have a tensile strength in the extrusion direction (MD) of at least 10 MPa, preferably at least 150 MPa, further preferably at least 20 MPa, in accordance with EN ISO 527.

In a preferred embodiment of the invention the covering layers B and/or C of the polymer film according to the invention independently of each other have a tensile strength transversely to the extrusion direction (TD) of at least 10 MPa, preferably at least 150 MPa, further preferably at least 20 MPa, in accordance with EN ISO 527.

Advantageously, the covering layers B and/or C of the polymer film according to the invention independently of each other have an elongation at break in the extrusion direction (MD) of at least 100%, preferably at least 150%, further preferably 180%, still further preferably at least 200%, in accordance with EN ISO 527.

Preferably, the covering layers B and/or C of the polymer film according to the invention independently of each other have an elongation at break transversely to the extrusion direction (TD) of at least 100%, preferably at least 150%, further preferably at least 180%, still further preferably at least 200%, in accordance with EN ISO 527.

In a further embodiment of the invention the middle layer A of the polymer film according to the invention has a tensile strength in the extrusion direction (MD) of at least 10 MPa, preferably at least 15 MPa, in accordance with EN ISO 527.

Advantageously, the middle layer A of the polymer film according to the invention has a tensile strength transversely to the extrusion direction (MD) of at least 10 MPa, preferably at least 15 MPa, in accordance with EN ISO 527.

Preferably, the middle layer A of the polymer film according to the invention has an elongation at break in the extrusion direction (MD) of at least 100%, preferably at least 150%, further preferably at least 200%, in accordance with EN ISO 527.

According to a preferred embodiment of the invention the middle layer A of the polymer film according to the invention has an elongation at break transversely to the extrusion direction (TD) of at least 100%, preferably at least 150%, further preferably at least 200%, in accordance with EN ISO 527.

In a preferred embodiment of the invention the covering layers B and C of the polymer film according to the invention are identical. This allows a particularly simple production of the polymer film according to the invention.

The teaching according to the invention can also be fulfilled by a multi-layer polymer film comprising at least one middle layer A, the polymeric constituents of which are soluble in aqueous solution, and in each case at least one substantially water-impermeable covering layer B, C arranged above and below the at least one middle layer A, wherein the layers A, B and C independently of each other in each case comprise at least one thermoplastic polymer and wherein the layer A has a tensile strength in accordance with EN ISO 527 of at least 15 MPa and the layers B and C in each case have a tensile strength in accordance with EN ISO 527 of at least 20 MPa.

In a further embodiment of the invention in addition to the middle layer A and the covering layers B and C one or more further layers are contained in the polymer film according to the invention. Such layers are preferably arranged between the middle layer and a covering layer. For example, possible further layers are adhesive layers, adhesion promoters or layers which additionally improve the mechanical properties. The following layer construction can be mentioned as an example of a multi-layer film comprising adhesion promoters: layer B—adhesion promoter—layer A—adhesion promoter—layer C.

The multi-layer film can in particular comprise still further covering layers B and/or C. For example, a multi-layer film having the following layer construction is also possible: layer B—layer B—layer A—layer C—layer C. An adhesion promoter can moreover be arranged between the individual layers.

Advantageously, the covering layers B, C and further covering layers possibly present can be produced by extrusion. In particular, the covering layers B, C and further covering layers possibly present are preferably not produced by application of a solution comprising the composition of the particular covering layers to a substrate.

The invention furthermore provides processes with which it is possible to obtain a multi-layer polymer film at least comprising a middle layer A, the polymeric constituents of which dissolve in aqueous solution, and in each case at least one substantially water-impermeable covering layer B, C arranged above and below the middle layer, wherein the layers A, B and C independently of each other in each case comprise at least one thermoplastic polymer and at least one of the covering layers B and C comprises at least one polyhydroxyalkanoate.

In principle the processes according to the invention comprise the following steps, wherein the individual steps can be carried out simultaneously or in succession and in any desired sequence and frequency:
a. provision of a polymer composition of the first covering layer which comprises at least one polyhydroxyalkanoate,
b. forming of the first covering layer,
c. provision of at least one thermoplastic polymer of the middle layer,
d. forming of a middle layer,
e. provision of a polymer composition of the second covering layer,
f. forming of the second covering layer.

Preferably, the process steps are carried out in the above-mentioned sequence.

Polymer composition in the context of the invention is understood as meaning any material which comprises at least one polymer, in particular it can comprise one, two or more polymers.

According to a further embodiment the process comprises joining of the individual layers at least over part of the surface.

In a preferred embodiment of the process according to the invention steps b., d. and f. are carried out simultaneously.

For economic and process technology reasons, it has proved advantageous for the process according to the invention to include a coextrusion step. This allows a rapid and inexpensive procedure.

In a further embodiment of the process according to the invention the process includes a laminating step. This allows a higher flexibility and additional layers can be incorporated into the polymer film very easily in this way.

Advantageously, in the process according to the invention at least one polyhydroxyalkanoate is added to the polymer composition in step e.

According to a further embodiment of the process according to the invention the process comprises a step in which the covering layers B and/or C and/or the multilayer film produced is stretched. By this means micropores can be generated in the layers, in particular in the covering layers B and/or C. According to a further embodiment of the process according to the invention the process includes a step in which the multi-layer film is stretched.

The multi-layer polymer films according to the invention are suitable for the most diverse purposes. In particular, the polymer films are suitable for the production of molded parts, films or bags. Due to the disintegration and the biodegradability in aqueous solutions, the polymer films according to the invention are particularly well-suited to the production of bags, in particular plastic carrier bags.

Finally, the invention also provides products which are produced or can be produced with the multi-layer polymer films according to the invention. Possible products are in particular molded parts, films or bags, for example refuse sacks, carrier bags, disposable utensils (e.g., beakers, cups, plates and cutlery), packaging films, bottles, fruit and vegetable dishes (so-called trays), packaging aids (loose-fill chips), mulch films and flowerpots.

The principle of the invention is to be explained in more detail in the following by examples.

The following materials were used for the comparative and embodiment examples: polylactic acid, PLA (INGEO 2003D, NATUREWORKS); poly(butylene adipate-coterephthalate), PBAT (ECOFLEX F Blend C 1201, BASF); poly(butylene sebacate-coterephthalate), PBST (ECOFLEX FS Blend A 1100, BASF); poly(butylene succinate-co-adipate), PBSA (GS Pla AD 92 WN, Mitsubishi); polycaprolactone, PCL (Capa 6800, Perstorp); thermoplastic starch, TPS (BIOPLAST TPS, Biotec); poly(hydroxybutyrateco-hexanoate), PHBH (AONILEXX 151 A, KANEKA); native potato starch (EMSLANDSTARKE SUPERIOR); polyvinyl alcohol, PVOH (Mowiflex TC 232 Kuraray); glycerol (OLEON); sorbitol (CARGILL).

Example 1 (Comparative Example)

Using a twin-screw extruder (co-rotating) of the Werner & Pfleiderer (COPERION ZSK 70 type, screw diameter 70 mm, L/D=36, the following polymer blend A was compounded (metered contents in percent by weight):

TABLE 1

| Recipe A | |
| --- | --- |
| | A |
| PBAT | 57.4 |
| Starch | 42.6 |

The following compounding parameters were maintained here:

TABLE 2

| Temperature profile ZSK 70 | | | | | | | | | | | |
|---|---|---|---|---|---|---|---|---|---|---|---|
| Zone 1 | Zone 2 | Zone 3 | Zone 4 | Zone 5 | Zone 6 | Zone 7 | Zone 8 | Zone 9 | Zone 10 | Zone 11 | Die |
| 25° C. | 190° C. | 190° C. | 170° C. | 170° C. | 170° C. | 170° C. | 170° C. | 155° C. | 100° C. | 150° C. | 140° C. |

Melt temperature at the die opening: 163° C.
Speed of rotation: 205 min$^{-1}$
Throughput: 400 kg/h
Degasification: active (vacuum, zone 9)
Water content: less than 1 wt. %
(measured after exit from the extruder)

Using a single-screw extruder of the COLLIN 30 [DR. COLLIN] type, screw diameter 30 mm, L/D=33, thermoplastic starch (TPS) with the following recipe was furthermore compounded (metered contents in percent by weight):

TABLE 3

| TPS recipe | |
|---|---|
| | TPS |
| Glycerin | 20 |
| Sorbitol | 10 |
| Starch | 70 |

Granules A were then melted with a single-screw extruder of the COLLIN 30 (DR. COLLIN) type, screw diameter 30 mm, L/D=33 and processed together with the thermoplastic starch TPS, which was likewise melted in a single-screw extruder of the COLLIN 30 (DR. COLLIN) type, screw diameter 30 mm, L/D=33, in a coextrusion step to give a three-layer film, wherein the middle layer comprised TPS and the covering layers comprised composition A. The mechanical properties of the three-layer film as well as the decomposability of the covering layers into smaller parts and the solubility of the middle layer in water were investigated.

For the investigation of the stability of the three-layer film in water, specimens of the film were clamped in slide frames and laid in natural sea water. The film was furthermore exposed to mechanical stress. The decomposition of the film was evaluated visually.

The results of this investigation are summarized in the following table.

TABLE 4

| Mechanical properties of the three-layer film and decomposability/solubility in water | | | | | | | | |
|---|---|---|---|---|---|---|---|---|
| Thickness covering layers (each) [μm] | Thickness middle layer [μm] | Specific dart drop [g/μm] ASTM D1709 | Tensile strength [MPa] EN ISO 527 MD | TD | Elongation at break [%] EN ISO 527 MD | TD | Decomposability covering layers | Solubility middle layer |
| 10 | 10 | 8 | 10.7 | 7.6 | 475 | 230 | No decomposition after 14 days | Middle layer intact after 14 days due to intact covering layers |

As can be seen from the table, the resulting film on the one hand has a tensile strength which are inadequate for the requirements of a bag. Furthermore, after 14 days no decomposition of the covering layers was to be seen, for which reason the film was still intact even after 14 days.

Example 2

Using a twin-screw extruder (co-rotating) of the Werner & Pfleiderer (COPERION) ZSK 40 type, screw diameter 40 mm, L/D=42, the following recipe B was compounded (metered contents in percent by weight):

TABLE 5

| Recipe | |
|---|---|
| | B |
| PBAT | 44.6 |
| PHBH | 19.8 |
| Starch | 20.5 |
| PVOH | 10 |
| PLA | 5.1 |

The following compounding parameters were maintained here:

TABLE 6

| Temperature profile ZSK 40 | | | | | | | | |
|---|---|---|---|---|---|---|---|---|
| Zone 1 | Zone 2 | Zone 3 | Zone 4 | Zone 5 | Zone 6 | Zone 7 | Zone 8 | Die |
| 25° C. | 150° C. | 150° C. | 140° C. | 130° C. | 130° C. | 130° C. | 130° C. | 130° C. |

Melt temperature at the die opening: 133° C.
Speed of rotation: 140 min$^{-1}$
Throughput: 40 kg/h
Degasification: active (vacuum, zone 7)
Water content: less than 1 wt. %
(measured after exit from the extruder)

Granules B were then melted with a single-screw extruder of the COLLIN 30 (DR. COLLIN) type, screw diameter 30 mm, L/D=33 and processed together with PVOH, which was likewise melted in a single-screw extruder of the COLLIN 30 (DR. COLLIN) type, screw diameter 30 mm, L/D=33, in a coextrusion step to give a three-layer film, wherein the middle layer comprised PVOH and the covering layers comprised composition B. The mechanical properties of the three-layer film as well as the decomposability of the covering layers into smaller parts and the solubility of the middle layer in water were investigated.

For the investigation of the stability of the three-layer film in water, specimens of the film were clamped in slide frames and laid in natural sea water. Furthermore, the film was exposed to mechanical stress. The decomposition of the film was evaluated visually.

The results of this investigation are summarized in the following table.

TABLE 7

| Mechanical properties of the three-layer film and decomposability/solubility in water | | | | | | | | |
|---|---|---|---|---|---|---|---|---|
| Thickness covering layers (each) [μm] | Thickness middle layer [μm] | Specific dart drop [g/μm] ASTM D1709 | Tensile strength [MPa] EN ISO 527 MD | TD | Elongation at break [%] EN ISO 527 MD | TD | Decomposability covering layers | Solubility middle layer |
| 10 | 10 | 25.4 | 37.0 | 40.3 | 281 | 234 | Smaller parts after 7 days | Completely dissolved after 7 days |

The table shows for this film significantly increased values for the tensile strength and good values for the elongation at break, which render it suitable, for example, for a bag. It was furthermore observed that after a few days both covering layers started to disintegrate into smaller parts, which exposed the middle layer, the polymeric constituents of which dissolved in aqueous solution.

Examples 3 to 15

Using a 5-layer blown film line of the Biotem 1015 [Dr. Collin) type with screw diameters of 20 mm, L/D=25, for the outer four layers and a screw diameter of 25 mm, L/D=25, for the inner layer, multi-layer films were produced. The following recipes were compounded in the extruders here for the covering layers (metered amounts in percent by weight}:

TABLE 8

| Recipes for the covering layers | | | | | | | |
|---|---|---|---|---|---|---|---|
| | C | D | E | F | G | H | J |
| PHBH | 84 | 72 | 63 | 26 | 30 | 58 | 75 |
| PBAT | 16 | 15 | 21 | 41 | 42 | 26 | 10 |
| PBST | — | 13 | — | — | — | — | — |
| Starch | — | — | 15 | 30 | 28 | 15 | — |
| PLA | — | — | 1 | 3 | — | 1 | — |
| PCL | — | — | — | — | — | — | 15 |

| | K | L | M | N | O |
|---|---|---|---|---|---|
| PHBH | 70 | 30 | 70 | 31 | 95 |
| PBAT | 17 | 42 | — | — | — |
| PBSA | 13 | — | — | — | — |

TABLE 8-continued

| Recipes for the covering layers | | | | | |
|---|---|---|---|---|---|
| Starch | — | 28 | — | — | — |
| PLA | — | — | 30 | 69 | — |
| PCL | — | — | — | — | 5 |

For multi-layer films in which recipe L was used for the covering layers TPS (see Example 1) was used for the middle layer. For multi-layer films in which recipes C to K, M to 0 and pure PHBH were used for the covering layers PVOH was used for the middle layer. The following combinations thus resulted for the multi-layer films:

TABLE 9

| Combinations of the recipes of the covering layers with the various middle layers | | |
|---|---|---|
| Multi-layer film no. | Covering layers | Middle layer |
| I | PHBH | PVOH |
| II | Recipe C | PVOH |
| III | Recipe D | PVOH |
| IV | Recipe E | PVOH |
| V | Recipe F | PVOH |
| VI | Recipe G | PVOH |
| VII | Recipe H | PVOH |
| VIII | Recipe J | PVOH |
| IX | Recipe K | PVOH |
| X | Recipe L | TPS |
| XI | Recipe M | PVOH |
| XII | Recipe N | PVOH |
| XIII | Recipe O | PVOH |

The following processing parameters were maintained:

TABLE 10

| | | Temperature profile Biotem 1015 | | | | | |
|---|---|---|---|---|---|---|---|
| Covering layer | Extruder | Zone 1 | Zone 2 | Zone 3 | Zone 4 | Flange 1 | Die |
| PHBH, recipes C, D, G, J, K, O | covering layers | 25° C. | 160° C. | 165° C. | 165° C. | 165° C. | 170° C. |
| | middle layer | 25° C. | 185° C. | 185° C. | 185° C. | 185° C. | 175° C. |
| Recipes E, F, H | covering layers | 25° C. | 180° C. | 180° C. | 180° C. | 180° C. | 175° C. |
| | middle layer | 25° C. | 185° C. | 185° C. | 185° C. | 185° C. | 175° C. |
| Recipe L | covering layers | 25° C. | 160° C. | 165° C. | 165° C. | 165° C. | 170° C. |
| | middle layer | 25° C. | 165° C. | 165° C. | 165° C. | 165° C. | 165° C. |
| Recipes M, N | covering layers | 25° C. | 180° C. | 185° C. | 185° C. | 185° C. | 185° C. |
| | middle layer | 25° C. | 185° C. | 185° C. | 185° C. | 185° C. | 175° C. |

Speed of rotation: 55-90 min$^{-1}$
Annular die: diameter 60 mm
Annular gap: 1.20 mm
Blow-up ratio: approx. 1:3.

Films having a total thickness of from 20 to 35 µm were produced. The multi-layer films had the construction of covering layer—covering layer—middle layer—covering layer—covering layer. The individual layers here had a ratio of covering layer:covering layer:middle layer:covering layer:covering layer of 1:1:2-4:1:1.

The films were then stored for at least 72 hours, before the mechanical properties were investigated.

TABLE 11

Mechanical properties of the multi-layer films

| Film | Specific dart drop [g/µm] ASTM D 1709 | Tensile strength [MPa] EN ISO 527 MD | Tensile strength [MPa] EN ISO 527 TD | Elongation at break [%] EN ISO 527 MD | Elongation at break [%] EN ISO 527 TD |
|---|---|---|---|---|---|
| I | 6 | 35 | 37 | 190 | 410 |
| II | 7 | 27 | 25 | 320 | 450 |
| III | 8 | 23 | 24 | 457 | 530 |
| IV | 8 | 24 | 26 | 418 | 491 |
| V | 11 | 37 | 40 | 281 | 234 |
| VI | 10 | 28 | 30 | 405 | 436 |
| VII | 5 | 37 | 28 | 216 | 228 |
| VIII | 9 | 22 | 24 | 480 | 562 |
| IX | 6 | 32 | 31 | 310 | 378 |
| X | 7 | 11 | 10 | 513 | 444 |
| XI | 5 | 47 | 49 | 209 | 220 |
| XII | 5 | 52 | 55 | 123 | 147 |
| XIII | 7 | 26 | 28 | 280 | 452 |

The table shows that on the basis of their mechanical properties films I to IX and XI to XIII are suitable in particular for plastic carrier bags. It was likewise observed that films I to XIII, when clamped in slide frames, laid in natural sea water and exposed to mechanical stress, disintegrated into smaller parts after several days in water. The middle layer dissolved here and the covering layers disintegrated into smaller parts.

The invention claimed is:

1. A multi-layer polymer film comprising:
at least one middle layer A, the polymeric constituents of which are soluble in aqueous solution;
at least one covering layer B that is water-impermeable so as to withstand a column of water of at least 20 mm in accordance with DIN EN 20811:1992; and
at least one covering layer C that is water-impermeable so as to withstand a column of water of at least 20 mm in accordance with DIN EN 20811:1992,
wherein the middle layer A is arranged between the layer B and the layer C, the layer B being arranged above or below the middle layer A and the layer C being correspondingly arranged below or above the middle layer A,
wherein the middle layer A and the layer C, independently of each other and independently of layer B, in each case comprise at least one thermoplastic polymer,
wherein the layer B, independently of middle layer A and layer C, comprises:
component (i), which includes at least one polyhydroxyalkanoate in an amount of 20 wt. % to 95 wt. % based on a total weight of the layer B,
component (ii), which includes at least one additional thermoplastic polymer, and
component (iii), which includes destructured starch, wherein a total amount of the destructured starch of component (iii) in the layer B is 0.5 to less than 10 wt. % based on the total weight of the layer B or wherein a total amount of the destructured starch of component (iii) in the layer B is 10 to 50 wt. % based on the total weight of the layer B,
wherein the layer B includes 70 wt. % to 100 wt. % by combined weight of the component (i), the component (ii), and the component (iii) based on the total weight of the layer B,
wherein the at least one polyhydroxyalkanoate of the component (i) of the layer B includes at least one of poly(3-hydroxybutanoate), poly(3-hydroxyvalerate), poly(3-hydroxyhexanoate), poly(3-hydroxybutyrate-co-3-hydroxyvalerate), poly(3-hydroxybutyrate-co-3-hydroxyhexanoate), or poly-4-hydroxybutyrate,
wherein the at least one additional thermoplastic polymer of the component (ii) of the layer B includes at least one of thermoplastic starch, starch-containing thermoplastics, polyvinyl alcohol, thermoplastic polyvinyl alcohol, polyvinyl acetate, poly(3-hydroxybutanoate), poly(3-hydroxyvalerate), poly(3-hydroxyhexanoate), poly(3-hydroxybutyrate-co-3-hydroxy-valerate), poly(3-hydroxy-butyrate-co-3-hydroxyhexanoate), polylactic acid, polycaprolactone, polybutylene succinate, poly(butylene adipate-co-succinate), aromatic-aliphatic copolyester, poly(butylene adipate-co-terephthalate), or poly(butylene sebacate-co-terephthalate), wherein the thermoplastic starch and the starch-containing thermoplastics, if included in component (ii) are an additional starch component or components distinct from the component (iii), which includes the destructured starch, and
wherein the polyhydroxyalkanoate of the component (i) of the layer B, through post-crystallization, causes or allows the layer B to disintegrate in aqueous solution within at most 14 days into parts having (i) a surface area of at most 60% of the total surface area of the multi-layer polymer film and/or (ii) a surface area of at most 100 cm$^2$.

2. The polymer film according to in claim 1, wherein the component (iii) of the layer B comprises said destructured starch in an amount of 25 to 40 wt. % based on the total weight of the layer B.

3. The polymer film according to in claim 1, wherein the component (iii) of the layer B comprises said destructured starch in an amount of 1 to 10 wt. % based on the total weight of the layer B or in an amount of 20 to 45 wt. % based on the total weight of the layer B.

4. The polymer film according to in claim 1, wherein the at least one polyhydroxyalkanoate of the component (i) of layer B is selected from the group consisting of poly(3-hydroxybutanoate), poly(3-hydroxyvalerate), poly(3-hydroxyhexanoate), poly(3-hydroxybutyrate-co-3-hydroxy-valerate), poly(3-hydroxybutyrate-co-3-hydroxyhexanoate), and mixtures thereof.

5. The polymer film according to in claim 1,
wherein the at least one additional thermoplastic polymer of the component (ii) of layer B is selected from the group consisting of polylactic acid, polycaprolactone, aromatic-aliphatic copolyesters, thermoplastic polyvinyl alcohol, polyvinyl acetate, polybutylene succinate, polybutylene adipate-co-succinate, and mixtures thereof.

6. The polymer film according to in claim 1, wherein the at least one additional thermoplastic polymer of the component (ii) of layer B is selected from the group consisting of polylactic acid, polycaprolactone, aromatic-aliphatic copolyesters, and mixtures thereof.

7. The polymer film according to in claim 1, wherein the at least one additional thermoplastic polymer of the component (ii) of layer B includes at least one of polylactic acid in an amount of 30 wt. % to 69 wt. % based on the total weight of the layer B, polycaprolactone in an amount of 5 wt. % to 15 wt. % based on the total weight of the layer B, or an aromatic-aliphatic copolyester in an amount of 5 wt. % to 70 wt. % based on the total weight of the layer B.

8. The polymer film according to in claim 1, wherein the at least one additional thermoplastic polymer of the component (ii) of layer B is selected from the group consisting of polylactic acid in an amount of 30 wt. % to 69 wt. % based on the total weight of the layer B, polycaprolactone in an amount of 5 wt. % to 15 wt. % based on the total weight of the layer B, aromatic-aliphatic copolyesters in an amount of 5 wt. % to 70 wt. % based on the total weight of the layer B, and mixtures thereof.

9. The polymer film according to in claim 1, wherein at least one of the layers B and C has a tensile strength in an extrusion direction (MD) of at least 10 MPa and a tensile strength transverse to the extrusion direction (TD) of at least 10 MPa.

10. The polymer film according to claim 1, wherein the at least one thermoplastic polymer of the layer C independently of the layer B comprises at least one thermoplastic polymer selected from the group consisting of thermoplastic starch, starch-containing thermoplastics, polyvinyl alcohol, thermoplastic polyvinyl alcohol, polyvinyl acetate, poly(3-hydroxybutanoate), poly(3-hydroxyvalerate), poly(3-hydroxyhexanoate), poly(3-hydroxybutyrate-co-3-hydroxyvalerate), poly(3-hydroxy-butyrate-co-3-hydroxyhexanoate), polylactic acid, polycaprolactone, polybutylene succinate, poly(butylene adipate-co-succinate), aromatic-aliphatic copolyester, poly(butylene adipate-co-terephthalate), poly(butylene sebacate-co-terephthalate), and mixtures thereof.

11. The polymer film according to claim 1, wherein the at least one thermoplastic polymer of the middle layer A is selected from the group consisting of thermoplastic starch, starch-containing thermoplastics, polyvinyl alcohol, thermoplastic polyvinyl alcohol, polyvinyl acetate, polyethylene glycol, cellulose acetate, ethylcellulose, hydroxypropylcellulose, hydroxypropyl-methylcellulose, poly(vinylpyrrolidone), poly(3-hydroxybutanoate), poly(3-hydroxyvalerate), poly(3-hydroxyhexanoate), poly(3-hydroxy-butyrate-co-3-hydroxyvalerate), poly(3-hydroxy-butyrate-co-3-hydroxyhexanoate), polylactic acid, polycaprolactone, polybutylene succinate, poly(butylene adipate-co-succinate), aromatic-aliphatic copolyester, poly(butylene adipate-co-terephthalate), poly(butylene sebacate-co-terephthalate), and mixtures thereof.

12. The polymer film according to claim 1,
wherein the layers B and/or C independently of each other disintegrate in aqueous solution within at most 7 days, into parts having a surface area of in each case at most 60% of the total surface area of the multi-layer polymer film, or
wherein the layers B and/or C independently of each other disintegrate in aqueous solution within at most 7 days, into parts having a surface area of in each case at most 100 cm².

13. The polymer film according to claim 1, wherein the polymer film has a total thickness of from 10 μm to 80 μm.

14. The polymer film according to claim 1, wherein the middle layer A of the polymer film makes up 30% to 90% of the total thickness of the polymer film.

15. The polymer film according to claim 1, wherein the layers B and C of the polymer film together make up 10% to 70% of the total thickness of the polymer film.

16. The polymer film according to claim 1, wherein the surfaces of the layers B and/or C independently of each other have a corrugated surface.

17. The polymer film according to claim 1, wherein the layers B and C are identical.

18. The polymer film according to in claim 1, wherein the component (iii) of the layer B comprises said destructured starch in an amount of 0.5 to 5 wt. % based on the total weight of the layer B.

19. The polymer film according to in claim 1, wherein the layer B is produced by extrusion.

20. The polymer film according to in claim 1, wherein the layer B is not produced by application of a solution comprising the component (i), the component (ii), or the component (iii) to a substrate.

21. A multi-layer polymer film comprising:
at least one middle layer A, the polymeric constituents of which are soluble in aqueous solution;
at least one covering layer B that is water-impermeable so as to withstand a column of water of at least 20 mm in accordance with DIN EN 20811:1992; and
at least one covering layer C that water-impermeable so as to withstand a column of water of at least 20 mm in accordance with DIN EN 20811:1992,
wherein the middle layer A is arranged between the layer B and the layer C, the layer B being arranged above or below the middle layer A and the layer C being correspondingly arranged below or above the middle layer A,
wherein the middle layer A and the layer C, independently of each other and independently of layer B, in each case comprise at least one thermoplastic polymer,
wherein the layer B, independently of middle layer A and layer C, comprises:
component (i), which includes at least one polyhydroxyalkanoate in an amount of 20 wt. % to 95 wt. % based on a total weight of the layer B,
component (ii), which includes at least one additional thermoplastic polymer, and
component (iii), which includes destructured starch, wherein a total amount of the destructured starch in the layer B is 0.5 to less than 10 wt. % based on the total weight of the layer B or wherein a total amount of the destructured starch of component (iii) in the layer B is 10 to 50 wt. % based on the total weight of the layer B,
wherein the layer B includes 95 wt. % to 100 wt. % by combined weight of the component (i), the component (ii), and the component (iii) based on the total weight of the layer B,
wherein the at least one polyhydroxyalkanoate of the component (i) of the layer B includes at least one of poly(3-hydroxybutanoate), poly(3-hydroxyvalerate), poly(3-hydroxyhexanoate), poly(3-hydroxybutyrate-co-3-hydroxyvalerate), poly(3-hydroxybutyrate-co-3-hydroxyhexanoate), or poly-4-hydroxybutyrate,
wherein the at least one additional thermoplastic polymer of the component (ii) of the layer B includes at least one of thermoplastic starch, starch-containing thermoplastics, polyvinyl alcohol, thermoplastic polyvinyl alcohol, polyvinyl acetate, poly(3-hydroxybutanoate), poly (3-hydroxyvalerate), poly(3-hydroxyhexanoate), poly(3-hydroxybutyrate-co-3-hydroxy-valerate), poly(3-hydroxy-butyrate-co-3-hydroxyhexanoate), polylactic acid, polycaprolactone, polybutylene succinate, poly(butylene adipate-co-succinate), aromatic-aliphatic copolyester, poly(butylene adipate-co-terephthalate), or poly(butylene sebacate-co-terephthalate), wherein the thermoplastic starch and the starch-containing thermoplastics, if included in component (ii) are an additional starch component or components distinct from the component (iii), which includes the destructured starch, and wherein the polyhydroxyalkanoate of the component (i) of the layer B, through post-crystallization, causes or allows the layer B to disintegrate in aqueous solution within at most 14 days into parts having (i) a surface area of at most 60% of the total surface area of the multi-layer polymer film and/or (ii) a surface area of at most 100 cm$^2$.

22. A process for producing a multi-layer polymer film, the process comprising:
 (a) providing a polymer composition of a first covering layer B which comprises
  component (i), which includes at least one polyhydroxyalkanoate in an amount of 20 wt. % to 95 wt. % based on a total weight of the first covering layer B,
  component (ii), which includes at least one additional thermoplastic polymer, and
  component (iii), which includes destructured starch, wherein a total amount of the starch in the layer B is 0.5 to less than 10 wt. % based on the total weight of the layer B or wherein a total amount of the destructured starch of component (iii) in the layer B is 10 to 50 wt. % based on the total weight of the layer B,
  wherein the first covering layer B includes 70 wt. % to 100 wt. % by combined weight the component (i), the component (ii), and the component (iii) based on the total weight of the first covering layer B,
 (b) forming the first covering layer B from the polymer composition in (a),
 (c) providing at least one thermoplastic polymer of a middle layer A,
 (d) forming the middle layer A from the at least one thermoplastic polymer of (c),
 (e) providing a polymer composition of a second covering layer C, and
 (f) forming the second covering layer C from the polymer composition in (e) so that the middle layer A is between first covering layer B and second covering layer C,
wherein the at least one polyhydroxyalkanoate of the component (i) of the first covering layer B includes at least one of poly(3-hydroxybutanoate), poly(3-hydroxyvalerate), poly(3-hydroxyhexanoate), poly(3-hydroxybutyrate-co-3-hydroxyvalerate), poly(3-hydroxy-butyrate-co-3-hydroxyhexanoate), or poly-4-hydroxybutyrate, wherein the at least one additional thermoplastic polymer of the component (ii) of the first covering layer B includes at least one of thermoplastic starch, starch-containing thermoplastics, polyvinyl alcohol, thermoplastic polyvinyl alcohol, polyvinyl acetate, poly(3-hydroxybutanoate), poly(3-hydroxyvalerate), poly(3-hydroxyhexanoate), poly(3-hydroxybutyrate-co-3-hydroxy-valerate), poly(3-hydroxy-butyrate-co-3-hydroxyhexanoate), polylactic acid, polycaprolactone, polybutylene succinate, poly(butylene adipate-co-succinate), aromatic-aliphatic copolyester, poly(butylene adipate-co-terephthalate), or poly(butylene sebacate-co-terephthalate), wherein the thermoplastic starch and the starch-containing thermoplastics, if included in the component (ii) are an additional starch component or components distinct from the component (iii), which includes the destructured starch, and wherein the polyhydroxyalkanoate of the component (i) of the first covering layer B, through post-crystallization, causes or allows the layer B to disintegrate in aqueous solution within at most 14 days into parts having (i) a surface area of at most 60% of the total surface area of the multi-layer polymer film and/or (ii) a surface area of at most 100 cm$^2$.

* * * * *